(12) United States Patent
Isler et al.

(10) Patent No.: US 9,922,261 B2
(45) Date of Patent: Mar. 20, 2018

(54) ROBOTIC SURVEYING OF FRUIT PLANTS

(71) Applicant: Regents of the University of Minnesota, Minneapolis, MN (US)

(72) Inventors: Volkan Isler, St. Paul, MN (US); Pratap Rajkumar Tokekar, Blacksburg, VA (US); Nikolaos Stefas, Minneapolis, MN (US); Pravakar Roy, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 15/131,745

(22) Filed: Apr. 18, 2016

(65) Prior Publication Data

US 2016/0307329 A1 Oct. 20, 2016

Related U.S. Application Data

(60) Provisional application No. 62/148,462, filed on Apr. 16, 2015, provisional application No. 62/240,833, filed on Oct. 13, 2015.

(51) Int. Cl.
| | |
|---|---|
| *G06K 9/48* | (2006.01) |
| *G06K 9/32* | (2006.01) |
| *G06T 3/00* | (2006.01) |
| *G06T 7/33* | (2017.01) |
| *G06T 7/11* | (2017.01) |

(Continued)

(52) U.S. Cl.
CPC ....... *G06K 9/3216* (2013.01); *G06K 9/00664* (2013.01); *G06K 9/4604* (2013.01); *G06K 9/6204* (2013.01); *G06T 3/0075* (2013.01); *G06T 7/11* (2017.01); *G06T 7/33* (2017.01); *G06T 7/62* (2017.01); *G06K 2209/17* (2013.01); *G06T 2207/10021* (2013.01); *G06T 2207/10024* (2013.01); *G06T 2207/10032* (2013.01);

(Continued)

(58) Field of Classification Search
None
See application file for complete search history.

(56) References Cited

U.S. PATENT DOCUMENTS

| | | |
|---|---|---|
| 6,312,385 B1 * | 11/2001 | Mo ....................... A61B 5/1075 600/443 |
| 8,837,811 B2 | 9/2014 | Sinha et al. |

(Continued)

OTHER PUBLICATIONS

Agarwal et al., Bundle Adjustment in the Large, Computer Vision-ECCV, Springer, 2010, pp. 29-42.

(Continued)

*Primary Examiner* — Feng Niu
(74) *Attorney, Agent, or Firm* — Theodore M. Magee; Westman Champlin & Koehler, P.A.

(57) ABSTRACT

A method of machine vision includes identifying contours of fruits in a first image and a second image and performing two-way matching of contours to identify pairs of matched contours, each pair comprising a respective first contour in the first image that matches a respective second contour in the second image. For each pair of matched contours, a respective affine transformation that transforms points in the respective second contour to points in the respective first contour is identified. The second image is mapped to the first image using the affine transformations to form a composite image and the number of fruits in the composite image is counted.

10 Claims, 11 Drawing Sheets

(51) Int. Cl.
G06T 7/62 (2017.01)
G06K 9/00 (2006.01)
G06K 9/46 (2006.01)
G06K 9/62 (2006.01)

(52) U.S. Cl.
CPC .............. G06T 2207/30128 (2013.01); G06T 2207/30188 (2013.01); G06T 2207/30242 (2013.01)

(56) References Cited

U.S. PATENT DOCUMENTS

| | | | | |
|---|---|---|---|---|
| 9,082,071 | B2* | 7/2015 | Skaff | G06N 7/005 |
| 2005/0063608 | A1* | 3/2005 | Clarke | G06T 3/4038 |
| | | | | 382/284 |
| 2008/0253685 | A1* | 10/2008 | Kuranov | G06T 3/4038 |
| | | | | 382/284 |
| 2013/0325346 | A1* | 12/2013 | McPeek | G01N 33/0098 |
| | | | | 702/2 |
| 2014/0312165 | A1* | 10/2014 | Mkrtchyan | B64D 47/08 |
| | | | | 244/13 |
| 2015/0296141 | A1* | 10/2015 | Zhang | G06T 3/4038 |
| | | | | 348/39 |
| 2016/0050840 | A1* | 2/2016 | Sauder | A01B 79/005 |
| | | | | 701/3 |
| 2016/0307350 | A1* | 10/2016 | Huang | G06K 9/4671 |

OTHER PUBLICATIONS

Bajcsy, Active Perception, Proceedings of the IEEE, Department of Computer and Information Science, vol. 76, No. 8, 1988, pp. 966-1005.
Baker et al., Lucas-Kanade 20 Years On: A Unifying Framework, International Journal of Computer Vision, vol. 56, No. 3, 2004, pp. 221-255.
Ball et al., Robotics for Sustainable Broad-Acre Agriculture, Proceedings of Field and Service Robotics (FSR 2013), pp. 1-14.
Bay et al., SURF: Speeded Up Robust Features, Computer Vision-ECCV, Springer, 2006, pp. 404-417.
Bergerman et al., Results with Autonomous Vehicles Operating in Specialty Crops, IEEE International Conference on Robotics and Automation, IEEE, 2012, pp. 1829-1835.
Bergerman et al., IEEE Robotics and Automation Society Technical Committee on Agricultural Robotics and Automation, IEEE Robotics and Automation Magazine, vol. 20, No. 2, 2013, pp. 20-23.
Bilmes et al., A Gentle Tutorial of the EM Algorithm and its Application to Parameter Estimation for Gaussian Mixture and Hidden Markov Models, International Computer Science Institute, vol. 4, No. 510, 1998, pp. 3-281.
Bradski et al., Learning OpenCV: Computer Vision with the OpenCV Library, O'Reilly Media, Inc., 2008, pp. 1-556.
Briechle et al., Template Matching Using Fast Normalized Cross Correlation, Aerospace/Defense Sensing, Simulation and Controls, International Society for Optics and Photonics, 2001, pp. 95-102.
Canny, A Computational Approach to Edge Detection, IEEE Transactions on Pattern Analysis and Machine Intelligence, vol. PAMI-8, No. 6, 1986, pp. 679-698.
Das et al., Devices, Systems, and Methods for Automated Monitoring Enabling Precision Agriculture, Proceedings of IEEE Conference on Automation Science and Engineering, 2015, 8 pages.
Dillow, Despite FAA Dithering, A Drone Economy Sprouts on the Farm, http://fortune.com/2014/09/16/despite-faa-dithering-a-drone-economy-sprouts-on-the-farm/, 2014, 9 pages.
Dobbs, Farms of the Future Will Run on Robots and Drones, http://www.pbs.org/wgbh/nova/next/tech/farming-with-robotics-automation-and-sensors/, 2014, 7 pages.
Eggert et al., Estimating 3-D Rigid Body Transformations: A Comparison of Four Major Algorithms, Machine Vision and Applications, vol. 9, Nos. 5-6, 1997, pp. 272-290.

Grunwald, A Tutorial Introduction of the Minimum Description Length Principle, arXiv Preprint Math/0406077, 2004, 80 pages.
Hodge et al., A Survey of Outlier Detection Methodologies, Artificial Intelligence Review, vol. 22, No. 2, 2004, pp. 85-126.
Ardupilot APM:Copter, http://copter.ardupilot.org/ardupilot/index.html, 2015, 3 pages.
DIYDrones, http://diydrones.com, 2015, 12 pages.
Mavros, http://wiki.ros.org/mavros?action=print, 2015, 21 pages.
DJI F550, http://www.dji.com, 2015, 2 pages.
Point Grey Chameleon USB 2.0 Cameras, http://www.ptgrey.com/chameleon-usb2-cameras, 2015, 1 page.
Hartigan et al., A K-Means Clustering Algorithm, Journal of the Royal Statistical Society, Series C. (Applied Statistics), vol. 28, No. 1, 1979, pp. 100-108.
Hu, Visual Pattern Recognition by Moment Invariants, IRE Transactions on Information Theory, vol. 8, No. 2, 1962, pp. 179-187.
Huang et al., Motion and Structure from Feature Correspondences: A Review, Proceedings of the IEEE vol. 82, No. 2, 1994, pp. 252-268.
Hung et al., Multi-Class Predictive Template for Tree Crown Detection, ISPRS Journal of Photogrammetry and Remote Sensing, vol. 68, 2012, pp. 170-183.
Hung et al., Orchard Fruit Segmentation Using Multi-Spectral Feature Learning, Intelligent Robots and Systems (IROS), IEEE/RSJ International Conference, 2013, pp. 5314-5320.
Hung et al., A Feature Learning Based Approach for Automated Fruit Yield Estimation, Field and Service Robotics, Springer, 2015, pp. 485-498.
Jimenez et al., A Survey of Computer Vision Methods for Locating Fruit on Trees, Transaction of the ASAE—American Society of Agricultural Engineers, vol. 43, No. 6, 2000, pp. 1911-1920.
Linker et al., Determination of the Number of Green Apples in RGB Images Recorded in Orchards, Computers and Electronics in Agriculture, vol. 81, 2012, pp. 45-57.
Lowe, Object Recognition from Local Scale-Invariant Features, Computer Vision, The proceedings of the seventh IEEE International Conference, IEEE vol. 2, 1999, pp. 1150-1157.
Mao et al., Detection and Position Method of Apple Tree Image, D. Li & C. Zhao, eds, Computer and Computing Technologies in Agriculture II, vol. 2 of IFIP Advances in Information and Communication Technology, Springer US, 2009, pp. 1039-1048.
Mulla, Twenty Five Years of Remote Sensing in Precision Agriculture: Key Advances and Remaining Knowledge Gaps, Biosystems Engineering, vol. 114, No. 4, 2013, pp. 358-371.
ODROID-U3, http://hardkernel.com, 2015, 3 pages.
Pixhawk, http://www.pixhawk.org, 2015, 1 page.
Tokekar et al., Sensor Planning for a Symbiotic UAV and UGV System for Precision Agriculture, IEEE/RSJ International Conference on Intelligent Robots and Systems (IROS), IEEE, 2013, pp. 5321-5326.
Underwood et al., Lidar-Based Tree Recognition and Platform Localization in Orchards, Field and Service Robotics, Springer, 2015, pp. 469-483.
Wang et al., Automated Crop Yield Estimation for Apple Orchards, Experimental Robotics, vol. 88, Springer Tracts in Advanced Robotics, Springer International Publishing, 2013, pp. 74-758.
Won et al., View Planning of a Multi-Rotor Unmanned Air Vehicle for Tree Modeling Using Silhouette-Based Shape Estimation, Frontiers of Intelligent Autonomous Systems, Springer, 2013, pp. 193-207.
Wu, VisualSFM: A Visual Structure from Motion System, 2011, 9 pages.
Faugeras et al., Motion from point matches: Multiplicity of solutions, International Journal of Computer Vision, vol. 4, No. 3, pp. 225-246, 1990.
Hartley et al., Multiple View Geometry in Computer Vision, Science & Engineering Library, University of California, Cambridge University Press, pp. 25-48, 2003.
Nister, An Efficient solution to the five-point relative pose problem, IEEE Transactions on Pattern Analysis and Machine Intelligence, vol. 26, No. 6, pp. 756-770, 2004.

(56) References Cited

OTHER PUBLICATIONS

Parsonage et al., Efficient Dense Reconstruction from Video, Conference for IEEE in Visual Media Production (CVMP), IEEE, pp. 30-38, 2011.
Quan et al., Linear N-point camera pose determination, IEEE Transactions on Pattern Analysis and Machine Intelligence, vol. 21, No. 7, 8 pages, 2011.
Roy et al., Robotic Surveying of Apple Orchards, University of Minnesota, Department of Computer Science, Technical Report, 25 pages, 2015.
Rubner et al., The earth mover's distance as a metric for image retrieval, International Journal of Computer Vision, vol. 40, No. 2, pp. 99-121, 2000.
Scaramuzza et al., Visual Odometry [tutorial], Robotics & Automation Magazine, IEEE, vol. 18, No. 4, pp. 80-92, 2011.
Torr, An assessment of information criteria for motion model selection, Proceedings of the Computer Vision and Pattern Recognition, IEEE Computer Society Conference, pp. 47-52, 1997.
Zhang, A flexible new technique for camera calibration, IEEE Transactions on Pattern Analysis and Machine Intelligence, vol. 22, No. 11, pp. 1330-1334, 2000.

* cited by examiner

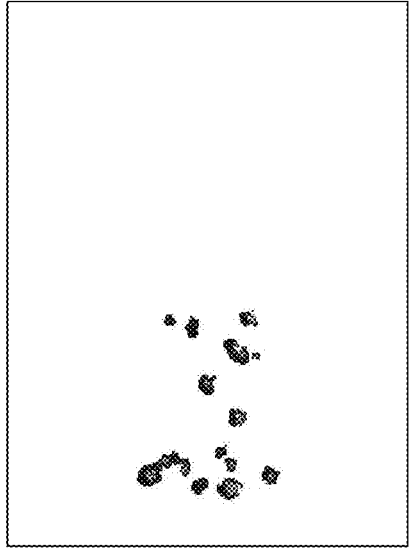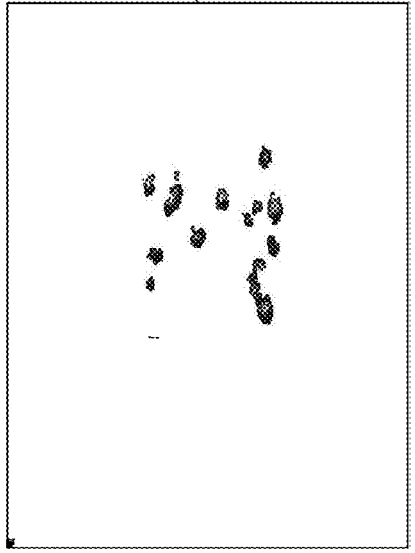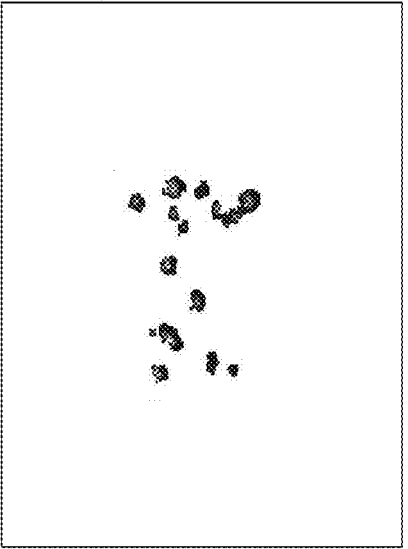
FIG. 6A
FIG. 6B
FIG. 6C

ROBOTIC SURVEYING OF FRUIT PLANTS

CROSS-REFERENCE TO RELATED APPLICATION

The present application is based on and claims the benefit of U.S. provisional patent application Ser. No. 62/148,462, filed Apr. 16, 2015 and Ser. No. 62/240,833, filed Oct. 13, 2015, the content of which is hereby incorporated by reference in its entirety.

This invention was made with government support under 1317788 and 1111638 awarded by the National Science Foundation. The government has certain rights in the invention.

BACKGROUND

Machine vision systems attempt to provide instructions to a computer such that the computer is able to identify and characterize certain objects in an image.

Some efforts have been made to apply machine vision systems to agriculture to evaluate the status of an agricultural plot. Using machine vision in agriculture is challenging due to inconsistent light levels, the difficulty of navigating through the agricultural plot and the natural shape of plants which tend to cause one portion of the plant to obscure other portions of the plant.

SUMMARY

A method of machine vision includes identifying contours of fruits in a first image and a second image and performing two-way matching of contours to identify pairs of matched contours, each pair comprising a respective first contour in the first image that matches a respective second contour in the second image. For each pair of matched contours, a respective affine transformation that transforms points in the respective second contour to points in the respective first contour is identified. The second image is mapped to the first image using the affine transformations to form a composite image and the number of fruits in the composite image is counted.

In accordance with a further embodiment, a method includes receiving a plurality of images and forming a plurality of composite images from the plurality of images, each composite image formed by mapping pixels from multiple images onto the composite image. The number of fruit in each composite image is counted to form a fruit count for each composite image. The fruit counts are summed to form a total fruit count.

In a further embodiment, a system includes an unmanned aerial vehicle having at least one camera that captures multiple images of an agricultural plot and a server that receives the captured multiple images and processes the captured multiple images to count fruit in the agricultural plot. The server processes the captured multiple images by forming a plurality of composite images, each composite image formed by mapping a respective plurality of the captured multiple images to the composite image. Fruit in the composite images is counted to form a separate count for each composite image. The separate counts are summed to form a total fruit count.

BRIEF DESCRIPTION OF THE DRAWINGS

FIG. 6A-6C show three separate reference frames.

DETAILED DESCRIPTION

The embodiments described below provide a machine vision system that is capable of counting and measuring the size of apples on apple trees in an orchard. Using machine vision systems in an orchard setting to perform these tasks is challenging because occlusions from leaves and branches prevent getting a good view of apples, colors of the apples are unreliable because of specularities and varying brightness conditions, and the smoothness of the apples causes the apples to lack globally distinguishable features making it difficult to find stereo correspondence. As a result, it is extremely difficult to create a three-dimensional image from two-dimensional images of an orchard and it is difficult to locate apples within a single image.

The embodiments described below use two cameras mounted on an unmanned aerial vehicle to capture images of apple trees in an orchard. The images are initially processed to segment pixels that are likely to represent an apple from the other pixels in the images. Edge detection is then used on the segmented pixels to identify a contour and bounding boxes are placed around the contours. Beginning with a reference image, affine transforms between contours that are common in pairs of images are identified. Each new image is then mapped onto the reference image to form a composite reference image by multiplying the affine transforms between the current image and the reference image. With each new image that is evaluated, the contours of the image are compared to the contours of the reference image. If the new image does not have any contours in common with the reference image, the new image is designated as a new reference image and the processing of the images continues using the new image as the new reference image. As a result, multiple composite reference images are created. Thus, instead of mapping all the images onto a single image, images are only mapped onto reference images for which they share at least one contour. This reduces the errors introduced into the composite reference image. After the composite reference images have been formed, edge detection is performed on the pixels of the reference images to identify contours in the reference images and to fit bounding boxes. A count of the apples in each bounding box is then made and the size of apples in at least some of the bounding boxes is determined. The counting and size determinations are done in each of the composite reference images.

Figure 1:
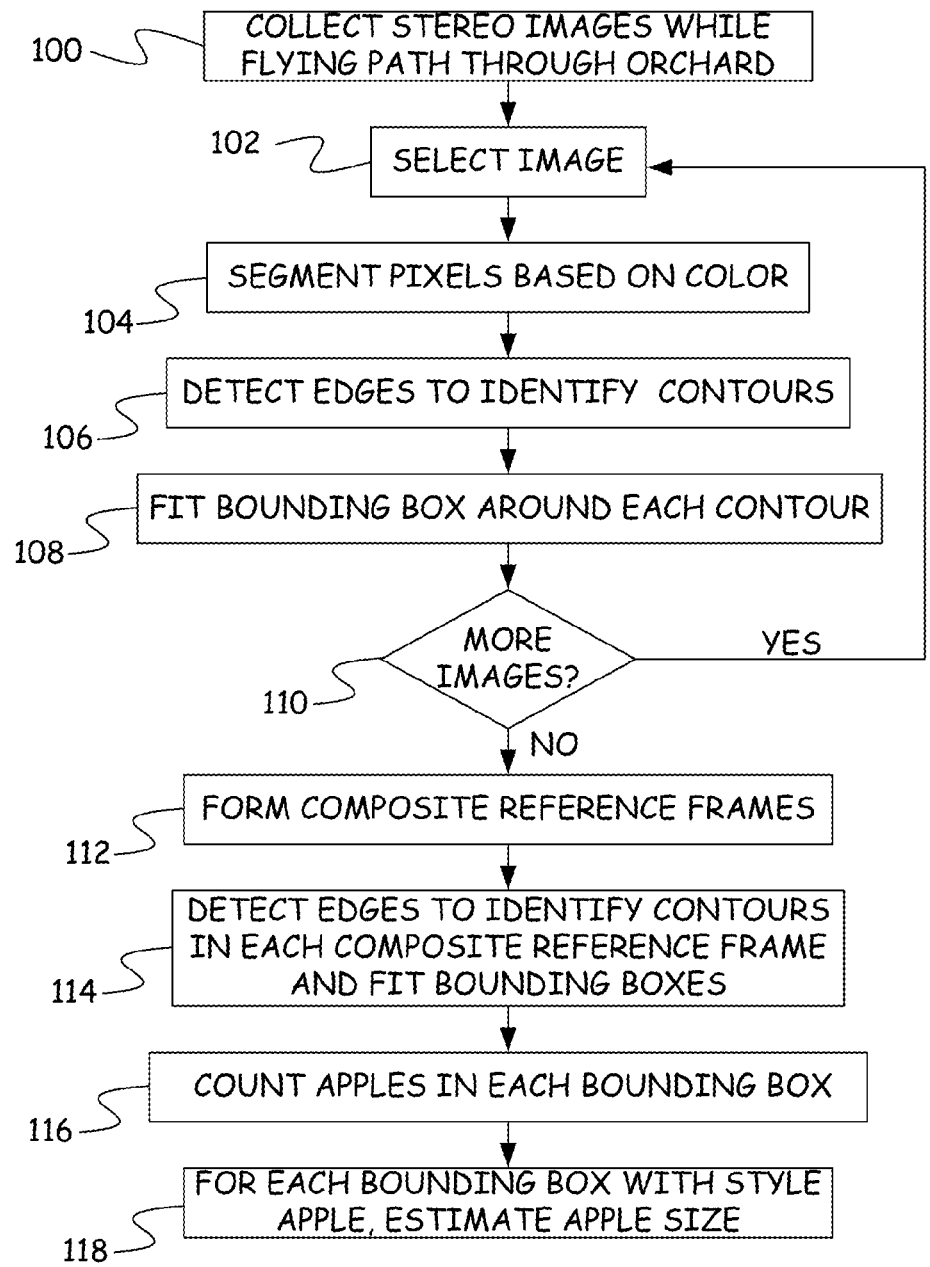
FIG. 1 is a flow diagram of a method in accordance with one embodiment.
Figure 2:
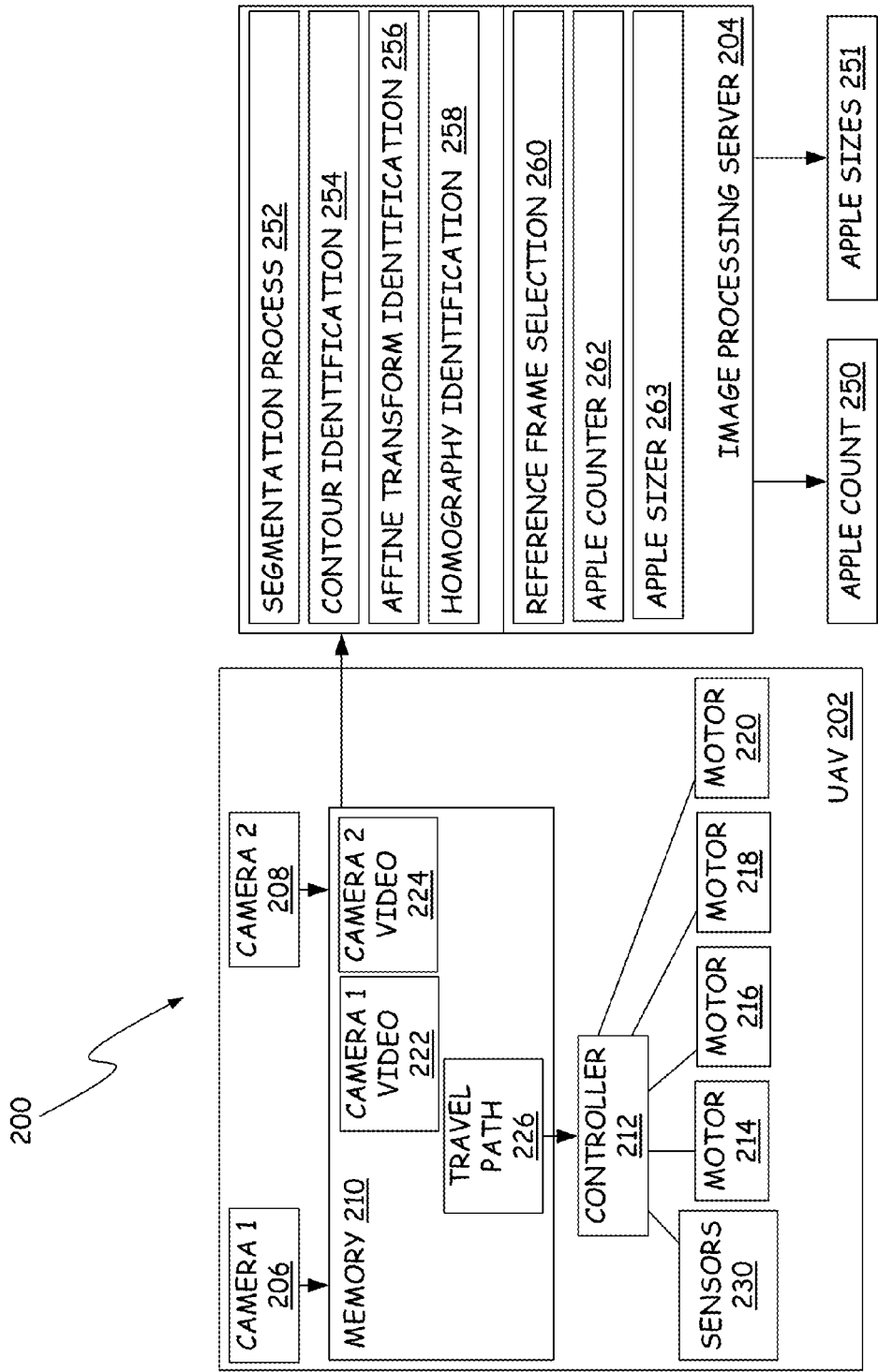
FIG. 2 is a block diagram of a system in accordance with one embodiment.

FIG. 1 provides a flow diagram of a method of counting and sizing apples in an orchard. FIG. 2 provides a block diagram of a system that performs the method of FIG. 1. In step 100 of FIG. 1, stereo images of trees in an orchard are collected while using an unmanned aerial vehicle 202. In particular, two cameras 206 and 208 are mounted on unmanned aerial vehicle 202, which has a plurality of rotor blades driven by respective motors 214, 216, 218 and 220. A travel path 226 is stored in a memory 210 and represents the path that UAV 202 is to travel to capture images of trees in an orchard. Travel path 226 is provided to controller 212, which controls motors 214, 216, 218 and 220 to drive the propellers so that UAV 202 follows travel path 226. One or more sensors, such as sensors 230 provide feedback to controller 212 as to the current position of UAV 202 and/or the accelerations that UAV 202 is experiencing.

In accordance with one embodiment, the flight path is confined to a vertical plane extending parallel to a row of apple trees. In one particular embodiment, the unmanned aerial vehicle flies a saw-toothed pattern within the vertical plane where the saw-toothed pattern includes a vertical segment where the unmanned aerial vehicle flies upward followed by a downward diagonal segment where the unmanned aerial vehicle flies downward and laterally followed by the next vertical upward segment. In addition, the unmanned aerial vehicle attempts to maintain a fixed pitch and fixed rotation relative to the vertical plane in order to limit the amount of rotation between images. In accordance with one embodiment, both cameras collect frames at a rate of 24 frames per second as the unmanned aerial vehicle moves along the saw-toothed flight path producing camera 1 video 222 and camera 2 video 224, which are stored in memory 210.

Periodically or in real-time, UAV 202 provides camera videos 222 and 224 to image processing server 204. Videos 222 and 224 may be provided over a wireless connection, a wired connection, or a combination of both between UAV 202 and image processing server 204. Image processing server 204 processes the frames of camera video 222 and camera video 224 to identify an apple count 250 and apple sizes 251.

In step 102, a segmentation process 252 executed by a processor on image processing server 204 selects one of the images from camera 1 video 222 or camera 2 video 224. At step 104, segmentation process 252 segments pixels based on color to remove pixels that are unlikely to represent apples.

Figure 3:
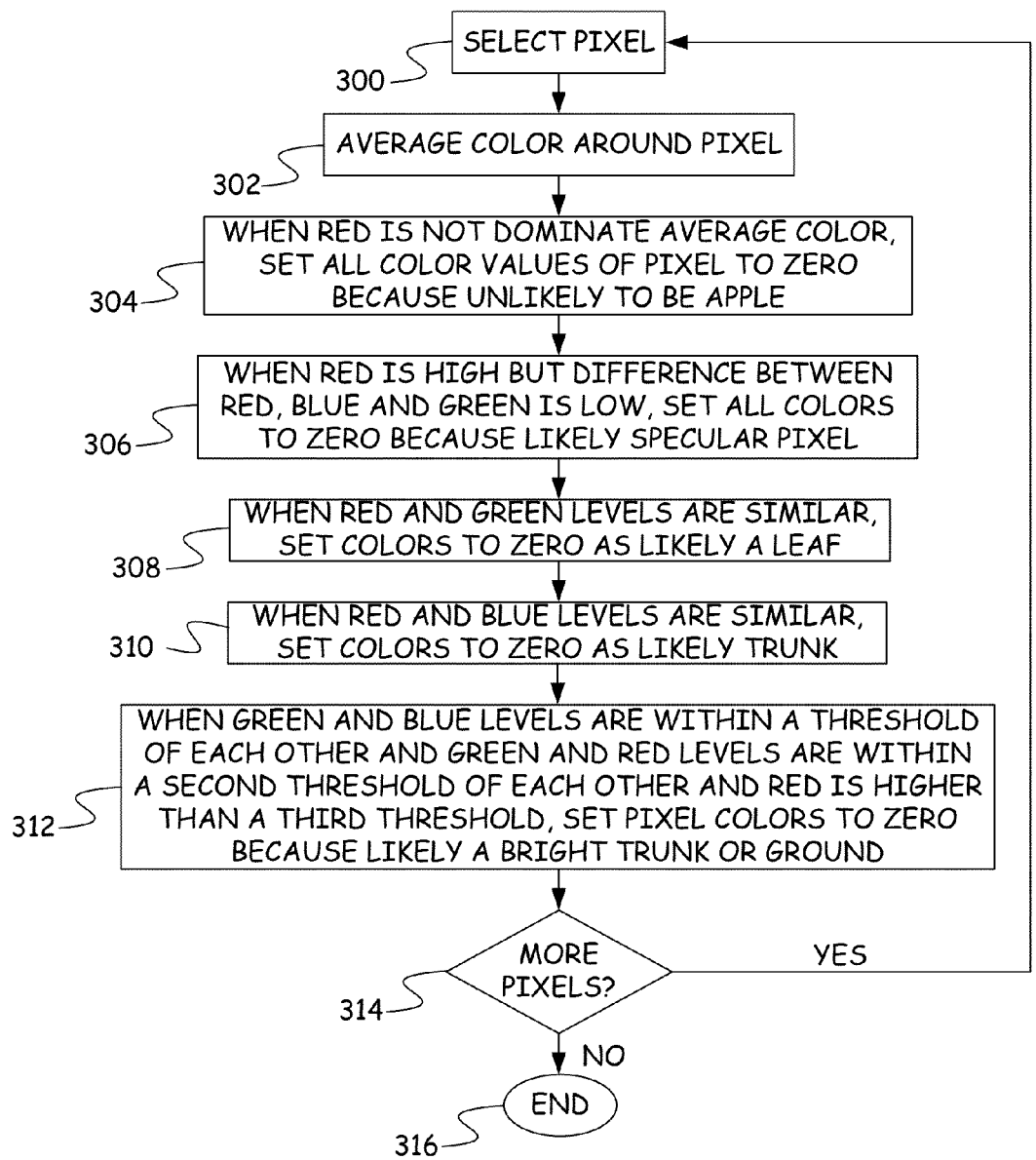
FIG. 3 is a flow diagram of a method of segmenting pixels.

FIG. 3 provides a flow diagram of a method in accordance with one embodiment for segmenting pixels in step 104. At step 300 of FIG. 3, a pixel is selected and at step 302, the RGB values for pixels neighboring the selected pixel are averaged. The RGB values represent the magnitudes of the Red, Green and Blue constituents of the pixel's color. At step 304, when the red value, R, isn't the dominate average color, all the RGB values of the pixel selected at step 300 are set to zero because it is unlikely that the pixel is an apple. At step 306, when the average Red value is high, but the difference between the Red, Blue and Green values is low, all the colors of the pixel selected at step 300 are set to zero because the pixel likely represents a specular reflection. At step 308, when the average Red and Green levels are similar, the color values for the pixel selected at step 300 are set to zero because the pixel likely represents a leaf. In step 310, when the Red and Blue values are similar, the color values of the pixel selected at step 300 are set to zero because the pixel likely represents a trunk. At step 312, when the Green and Blue levels are within a threshold of each other, and the Green and Red levels are within a second threshold of each other and the Red level is higher than a third threshold, the pixel colors of the pixel selected at step 300 are set to zero because the pixel likely represents a bright trunk or ground. At step 314, the process determines if there are more pixels in the image. If there are more pixels, the next pixel is selected at step 300. When there are no more pixels at step 314, the process ends at step 316. At step 316, all pixels that are unlikely to represent an apple have had their color values set to zero leaving only those pixels that are likely to represent an apple.

Returning to FIG. 1, at step 106, a contour identification process 254 executed by a processor on image processing server 204 uses Canny edge detection on the segments of pixels to compute a set of contours and fit a bounding rectangle to each contour at step 108.

Figure 4B:
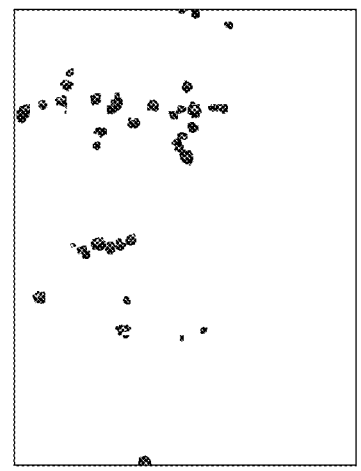
FIG. 4B shows segmented pixels for the image of FIG. 4A.
Figure 4D:
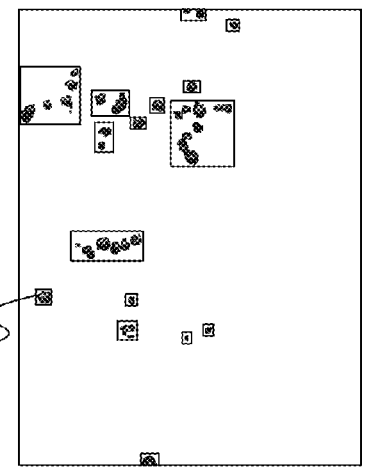
FIG. 4D shows bounding boxes for the contours of FIG. 4C.
Figure 4A:
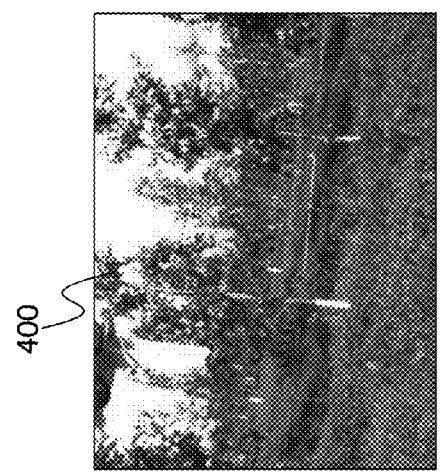
FIG. 4A is an image of an orchard.
Figure 4C:
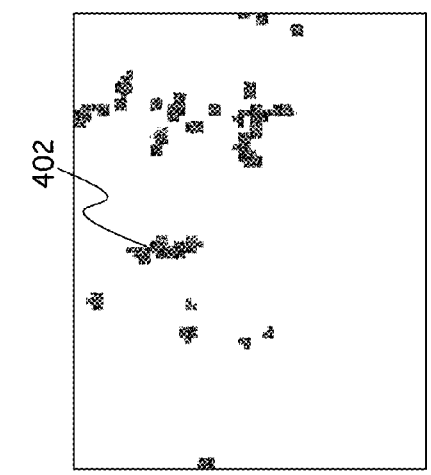
FIG. 4C shows contours identified from the pixels of FIG. 4B.

FIGS. 4A, 4B, 4C and 4D show the results of steps 104, 106 and 108 for an image 400 shown in FIG. 4A. FIG. 4B shows the results of segmentation step 104 where the vast majority of pixels have been removed by setting their RGB values to zero and the remaining pixels are those that are likely to contain an apple. FIG. 4C shows the contours identified using the Canny edge detection of step 106. For example, FIG. 4C shows a contour 402. FIG. 4D shows bounding boxes, such as bounding box 404 that are placed around the contours at step 108.

At step 110, image processing server 204 determines if there are more images to process. If there are more images, the process returns to step 102 and selects a new image and repeats steps 104, 106 and 108. When all the images have been processed at step 110, the method continues at step 112 where composite reference frames are formed by a reference frame formation process 260 executed by a processor on image processing server 204. A composite reference frame is a segmented image onto which pixels from other images have been mapped using affine transforms. As a result, each composite reference frame contains more pixels than a single segmented image and thus captures more pixels of apples on a tree making it easier to identify and size the apples on a tree. If all the segmented images were mapped to a single composite reference frame, errors in the mapping would accumulate onto the composite reference frame. In addition, clusters from images that are distant from the composite reference frame are warped such that they become smaller in the composite reference frame. To avoid this, embodiments described herein create a number of different composite reference frames and independently count the number of apples in each composite reference frame. The counts of each composite reference frame are summed to form the total apple count.

Figure 5:
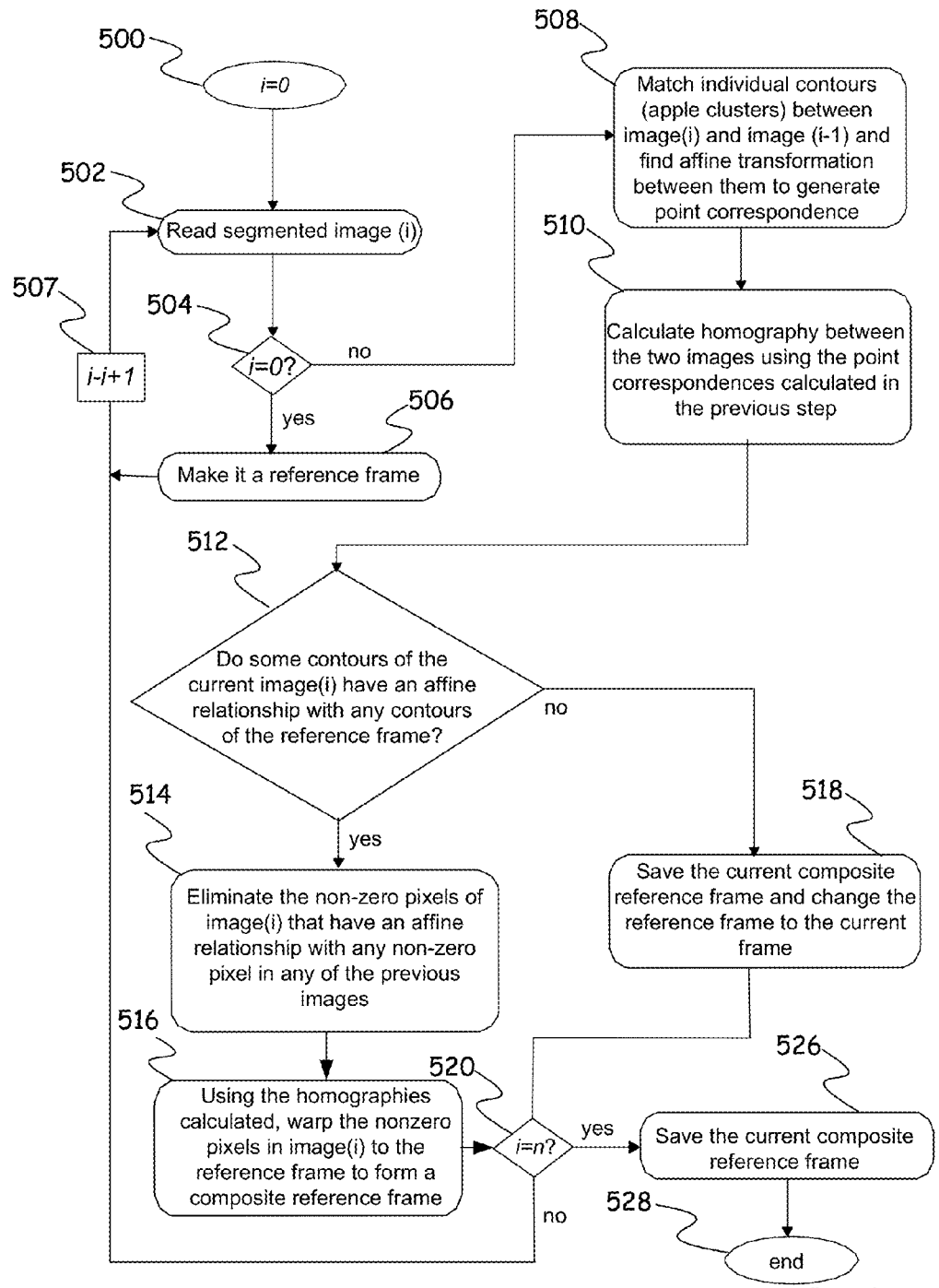
FIG. 5 is a flow diagram of a method of forming composite reference frames.

FIG. 5 provides a flow diagram of a method of forming the composite reference frames at step 112. At step 500, an image counter, i, is set to zero and at step 502, the segmented image i is read. At step 504, if this is the first image and i=0, the image is marked as a reference frame at step 506 and the image counter is incremented at step 507 before returning to step 502 to read the next segmented image i. When the image is not the first image at step 504, the process continues at step 508, where affine transform identification process 256 executed by a processor on image processing server 204 matches individual contours (apple clusters) between image (i) and image (i−1), and finds affine transforms between the clusters to generate point correspondence. For example, suppose $i_1$ and $i_2$ are the two images and cluster $c_2$ is in image $i_2$. Initially, a one-way match is performed where the area around the bounding box for cluster $c_2$ in image $i_1$ is searched to determine if there are any clusters in that area in image $i_1$ that are a template match for $c_2$. If there is a matching cluster $c_1$ in image $i_1$ for cluster $c_2$ in image $i_2$, then template matching is performed again in image $i_2$ around the area of cluster $c_1$ to determine if there are any clusters that match cluster $c_1$ in image $i_2$. If cluster $c_2$ is identified as the best match for cluster $c_1$ of image $i_1$ then the two contours $c_2$ and $c_1$ are considered to match and be the same cluster. If however, the second search of image $i_2$ for a match for cluster $c_1$ identifies a separate cluster, then cluster $c_2$ and $c_1$ are not considered to be matches and are not considered to be the same cluster. The process of template matching can be sped up by taking into consideration the movement of the cameras between images based on sensor data.

After the contours have been matched, affine transforms are determined for each matching cluster pairs. For any one pair of clusters, the correct affine transformation between the matching contours, A, can be determined by minimizing:

$$\sum_x \sum_y c_1(x, y) - c_2(A*(x, y)) \quad (1)$$

where, $c_1$ and $c_2$ are the corresponding clusters, x,y are pixel locations in the clusters and A is the affine transformation. Because the path of the unmanned aerial vehicle has been chosen to be along a vertical plane and the unmanned aerial vehicle is flown to keep rotation and movement toward and away from the trees extremely small, the rotation and scaling of the affine transform is extremely small. Therefore, solving for the affine transform mostly involves solving for translation. Since the solution space is small, some embodiments perform an exhaustive search to discover the best affine transform for each contour pair. Within a contour, the affine transform provides point correspondence that links one pixel in contour $c_1$ with one pixel in contour $c_2$.

At step 510, a homography identifier 258 executed by a processor on image processing server 204 calculates homography between the two images using the point correspondence calculated in step 508. The resulting homography describes how each pixels in image i maps to image i−1.

At step 512 the contours of the current image are compared to the contours of the reference image to determine if any of the contours of the current image are present in the reference frame. If at least one contour in the current image is in the reference frame, the process continues at step 514, where the non-zero pixels of image (i) that have an affine relationship with any non-zero pixel in any of the previous images between current image (i) and the current reference frame are eliminated from image (i). This elimination removes redundant pixel values since the affine transform of the non-zero pixel would be mapped onto a non-zero pixel in the composite reference frame. Thus, the first non-zero pixel that can be mapped onto the composite reference frame is selected as the non-zero pixel for the composite reference frame and any later non-zero pixels that would be mapped onto the same pixel are eliminated.

Once the non-zero pixel values that have an affine relationship with non-zero pixel values in any of the previous images have been eliminated, the homographies calculated in step 510 between the current image and the preceding image i−1 and the homographies between all pairs of images between the current image and the reference frame are used to map or warp the non-zero pixels of image (i) to the composite reference frame at steep 516 to form or add to a composite reference frame that includes pixels from all of the images between the current image and the reference frame.

If none of the contours of the current image (i) have an affine relationship with any of the contours of the reference frame at step 512, then current image (i) is sufficiently different from the reference frame that a new reference frame should be identified. As a result, at step 518, the current composite reference frame is saved and current image (i) is identified as the new reference frame and the new composite reference frame.

After steps 516 and 518, the method determines if the current image is the last image to be processed at step 520. If the current image is not the last image to be processed, the method continues at step 507 where the image index, i, is incremented by one so that the next image is read at step 502. When the current image is the last image at step 520, the current composite reference frame is saved at step 526 and the process ends at step 528.

The method of FIG. 5 results in a plurality or collection of composite reference frames such as composite reference frames 600, 602 and 604 of FIGS. 6A, 6B and 6C. These composite reference frames are mutually exclusive in that the contours found in one composite reference frame are not present in any of the other composite reference frames.

Returning to FIG. 1, after the composite reference frames have been formed at step 112, contour identification process 254 detects edges in the pixels of the composite reference frames to identify contours in each composite reference frame and fits bounding boxes around each contour at step 114. At step 116, apples in each bounding box of each composite reference frame are counted using apple counter 262 executed by the processor of image processing server 204.

Figure 7:
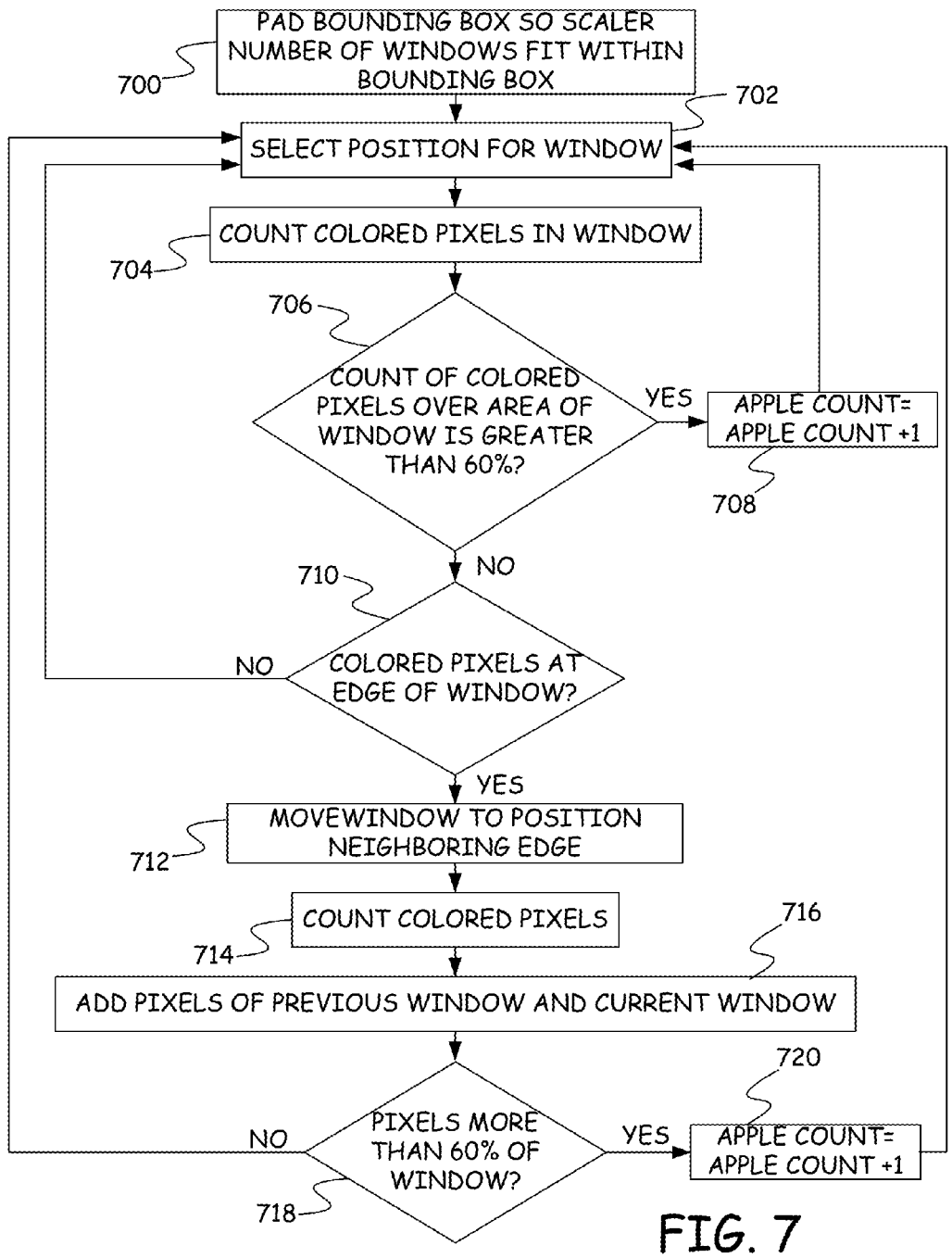
FIG. 7 is a flow diagram of a method of counting apples in reference frames in accordance with one embodiment.
Figure 8:
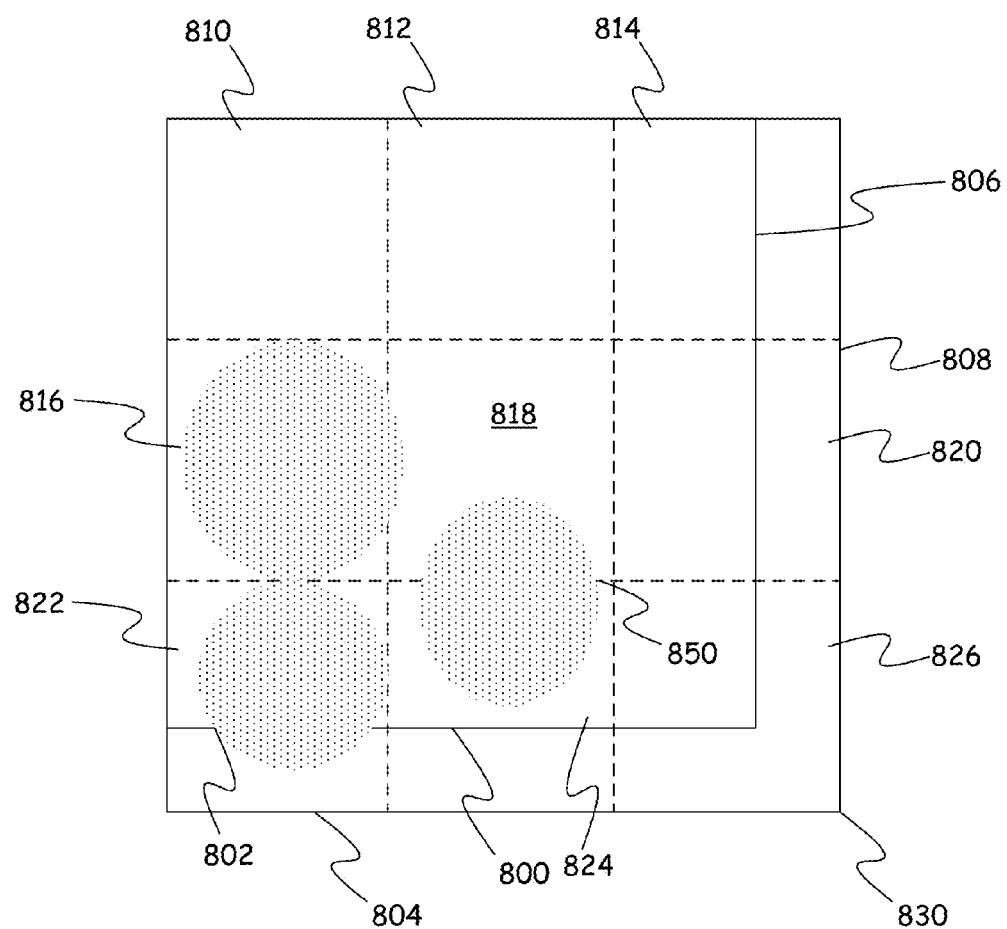
FIG. 8 is a diagram of a bounding box showing the counting of apples in the bounding box using the method of FIG. 7.

FIG. 7 provides a flow diagram of one method of performing step 116 and FIG. 8 provides a diagram of the application of a pixel window to a bounding box in the process of FIG. 7.

At step 700 of FIG. 7, a bounding box 800 is padded so that a scaler number of pixel windows fit within the bounding box. For example, in FIG. 8, bounding box 800 is padded vertically to increase its height by dropping its bottom edge 802 to edge 804 and moving its right edge 806 to become right edge 808. As a result of these movements, 9 complete pixel windows 810, 812, 814, 816, 818, 820, 822, 824 and 826 fit within the enlarged bounding box 830.

At step 702, a position for a pixel window is selected and at step 704, the count of the colored pixels in the window is performed. At step 706, if the colored pixels cover over 60% of the available pixels in the window, the apple count is increased by one at step 708 and the process returns to step 702 to select a new position for the window. In accordance with one embodiment, the new position for the window is selected so that it does not include any part of a previously selected position for the window. Window position 816 and window position 822 show examples of windows in which the pixels cover 60% of a window and thus add to the apple count.

If a window, such as window position 818 does not include pixels that cover 60% of the window, the pixels that are in the window are examined to determine if they are at an edge of the window at step 710. If the pixels are at the edge of a window, the window next to that edge is selected at step 712. For example, if window 818 had been selected at step 702, the pixels at edge 850 of window 818 would cause window 824 to be selected at step 712. At step 714, the colored pixels in window 824 are counted and at step 716, the pixels of the previous window and the pixels of the current window are summed. If the pixels of the previous window and the current window together represent more than 60% of the pixels in a window at step 718, the apple count is increased by one at step 720 and the process returns to step 702 to select a new window in the bounding box. If the count of the pixels in the previous window and the current window do not cover more than 60% of the pixels in a window at step 718, the process returns to step 702 to select a new window. After all of the possible positions for the window have been selected, the total apple count is returned.

In accordance with a second embodiment, a Gaussian Mixture Model is constructed and is used to count apples in each cluster. In the GMM method, each apple is modelled by a Gaussian probability distribution function (pdf) and apple clusters are modelled as mixture of Gaussians. This embodiment starts by converting the input cluster image I to binary. Let this binary image be denoted by $I_b$. The locations of the non-zero pixels in the binary image are used as input to the GMM.

Let X represent the set of apples we are trying to find. Then, we can convert the problem to a Gaussian Mixture Model formulation in the following way:

$$P(I_b|X)=G^k(\varphi,\mu,\Sigma)=\Sigma_{i=1}^k \varphi_i G_i(\mu_i,\Sigma_i)$$

Here, $G^k(\varphi,\mu,\Sigma)$ is a Gaussian Mixture Model with k components, and $G_i$ is the ith component of the mixture. $\mu_i$ and $\Sigma_i$ are the mean and covariance of the ith component. The covariance matrix $\Sigma_i=[\sigma_{x_i}^2,\sigma_{y_i}^2]$ is diagonal. $\varphi_i$ is the weight of the ith component where $\Sigma_{i=1}^k \varphi_i$ and $0 \le \varphi_i \le 1$.

Given model parameters $\Theta=\{\varphi,\mu,\Sigma\}$, the problem of finding the location of the center of the apples and their pixel diameters can be formulated as computing the world model which maximizes $P(I_b|X)$. Each component $G_i(\mu_i,\Sigma_i)$ of the mixture model represents an apple with center at $\mu_i$, equatorial radius $2\sigma_{x_i}$ and axial radius $2\sigma_{y_i}$.

A common technique to solve for arg max $P(I_b|X)$ is the expectation maximization (EM) algorithm. As is well-known, EM provides a local greedy solution for the problem. Since EM is susceptible to local maxima, initialization is very important. We used MATLAB's implementation of K-means (which uses randomly-selected seeds to avoid local maxima) for initialization of EM.

In the Gaussian Mixture Model embodiments, the number of components k is the total number of apples in image I. EM enables us to find the optimal location of the apples given the total number of apples k. The present embodiments provide a method to calculate the correct k.

Let the correct number of apples in the input image be denoted by K. The present embodiments use a new heuristic approach for evaluating mixture models with different number of components based on Minimum Description Length (MDL). Unlike classic MDL based approaches the present embodiments have both reward and penalty.

Let $\sigma_{min}=\min(\sigma_{x_i},\sigma_{y_i})$ and $\sigma_{max}=\max(\sigma_{x_i},\sigma_{y_i})$. Using the mean and co-variances of the ith component we define a 2D Gaussian kernel $\mathcal{G}(\mu_i,2\sigma_{max},\sigma_{max})$ where $2\sigma_{max}$ is a square window size and $\sigma_{max}$ is the variance. Let $P(\mu_i)$ denote the response of the kernel when placed at the center $\mu_i$ in the original input image I and $C_i$ denote the total number of pixels clustered by $G_i(\mu_i,\Sigma_i)$.

For each component $G_i(\mu_i,\Sigma_i)$, of the mixture model $G^k(\varphi,\mu,\Sigma)$ we define the reward $R_i$ in the following way, $$R_i(G_i) = \phi_i \left[ P(\mu_i) + P(\mu_i)\left(\frac{\sigma_{min}}{\sigma_{max}}\right)^2 + P(\mu_i)\frac{c_i}{4\pi\sigma_{min}\sigma_{max}} - \frac{1}{3}(4\pi\sigma_{x_i}\sigma_{y_i} - C_i) \right]$$

All four terms in this equation reward specific spatial characteristics of the Gaussian pdf. $P(\mu_i)$ represents the strength of the distribution in terms of pixel values and is present in the first three terms. The second term rewards circularity, and the third term rewards coverage. The fourth term penalizes Gaussian pdfs covering large area and clustering very few points.

Now if we find out the reward $R_i(G_i(\mu_i,\Sigma_i))$ for all the components k, the total reward for the mixture model $G^k(\varphi,\mu,\Sigma)$ can be computed by summing them together.

Next, we define the penalty term. The traditional MDL penalty term is U=cp log(|Y|) where p is the number of parameters in the model, |Y| is the total size of the input data, and c=½ is a constant. Based on this principle, our penalty term, $V(G^k(\varphi,\mu,\Sigma))$, is defined as the following:

$$V(G^k(\varphi,\mu,\Sigma))=c'(3k)\log(\Sigma_x(I_b(x)\ne 0))$$

where x represents the pixel index across the image $I_b$. Compared to a traditional MDL based penalty we have the constant c'=3/2 instead of =½. This is attributed to the fact that the reward expression has three terms compared to one. The number of components k is multiplied by three as each Gaussian has three parameters $(\mu_i,\sigma_{x_i},\sigma_{y_i})$. With these terms defined, we choose the correct number of components κ in the following way:

$$\kappa=\arg_k \max R(G^k(\varphi,\mu,\Sigma))-V(G^k(\varphi,\mu,\Sigma))$$

Returning to FIG. 1, after the apple count has been performed for each composite reference frame, the size of apples in each composite reference frame is determined at step 118. In particular, for each bounding box that includes only one contour, a size of an apple represented by the contour is determined by an apple sizer 263 executed by a processor on image processing server 204.

Figure 9:
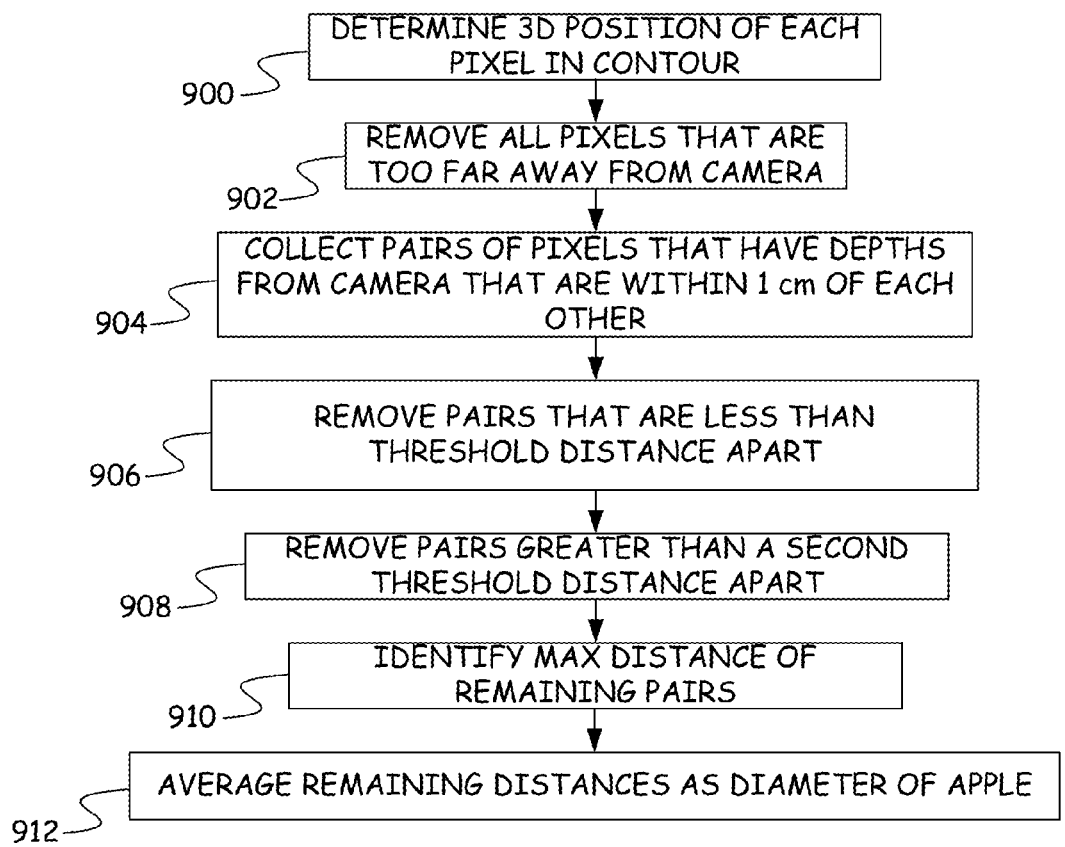
FIG. 9 is a flow diagram of a method of identifying a diameter of apples in the bounding box.

FIG. 9 provides a flow diagram of a method of performing step 118 in accordance with one embodiment. At step 900 of FIG. 9, a 3D position of each pixel in the contour is determined using the point correspondence between two images used to form the composite reference frame. At step 902, all pixels in the contour that are too far away from the camera to be part of the apple are removed. At step 904, pairs of pixels that have depths from the camera that are within 1 cm of each other are identified. At step 906, pairs that are less than a threshold distance apart are removed from further consideration since they cannot both be at the outer contours of the apple. At step 908, pairs of pixels that are greater than a second threshold distance apart are removed since they cannot be on the same apple. At step 910, the pairs that are remaining are examined to identify the pair of pixels that are the maximum distance apart. At step 912, all pairs that are separated from each other by a distance that is within a threshold of the maximum distance identified at step 910 are selected and at step 914, the distance between the selected pairs are averaged to form the diameter of the apple thereby producing apple sizes 251 of FIG. 2.

Figure 10:
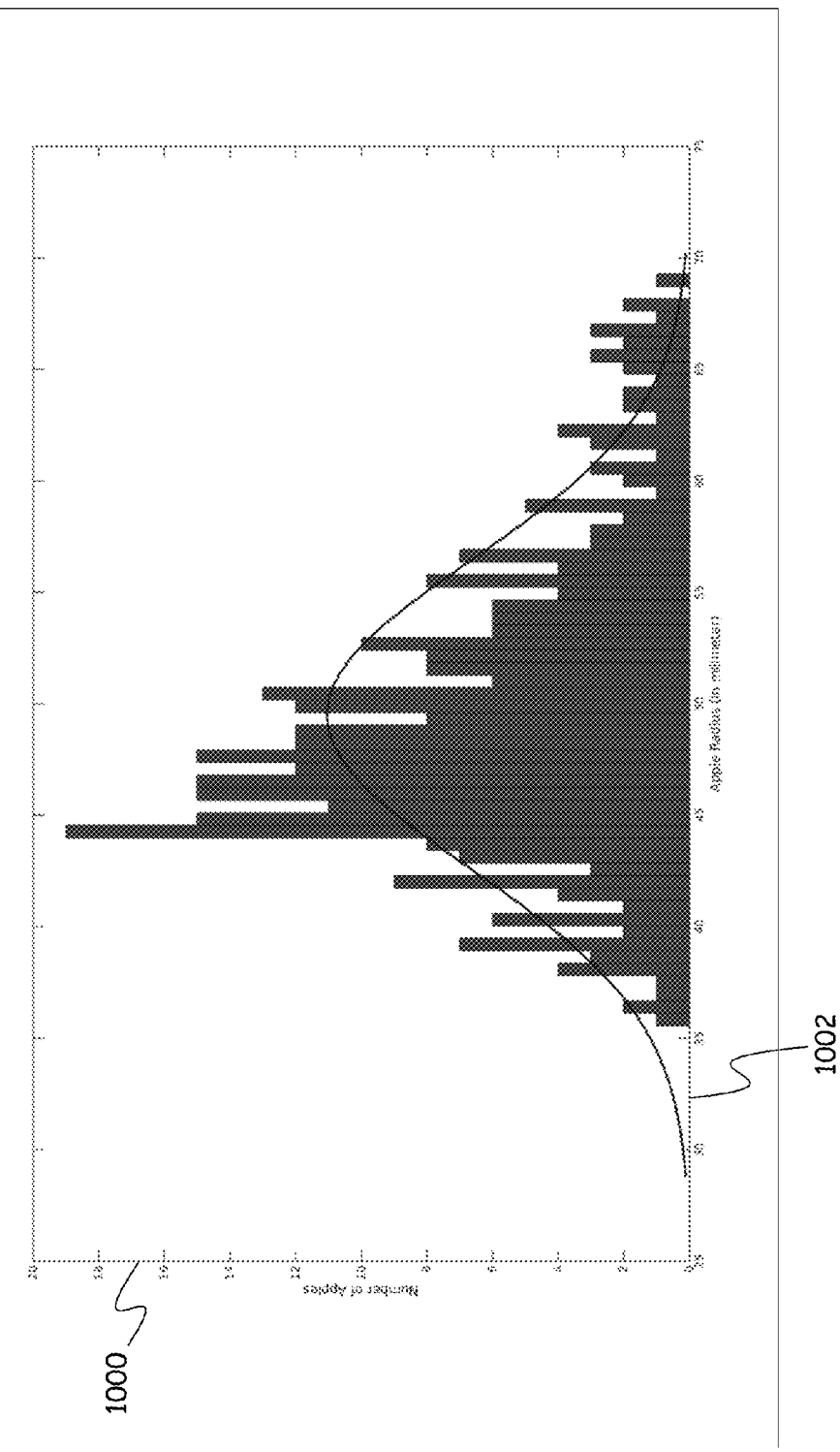
FIG. 10 is a histogram of apple sizes determined using the flow diagram of FIG. 9.

FIG. 10 provides a histogram of apple sizes determined using FIG. 9. In FIG. 10, vertical axis 1000 shows the number of apples and horizontal access 1002 shows various diameter sizes. Each bar in FIG. 10 represents the count of apples with a particular apple radius in millimeters.

Figure 11:
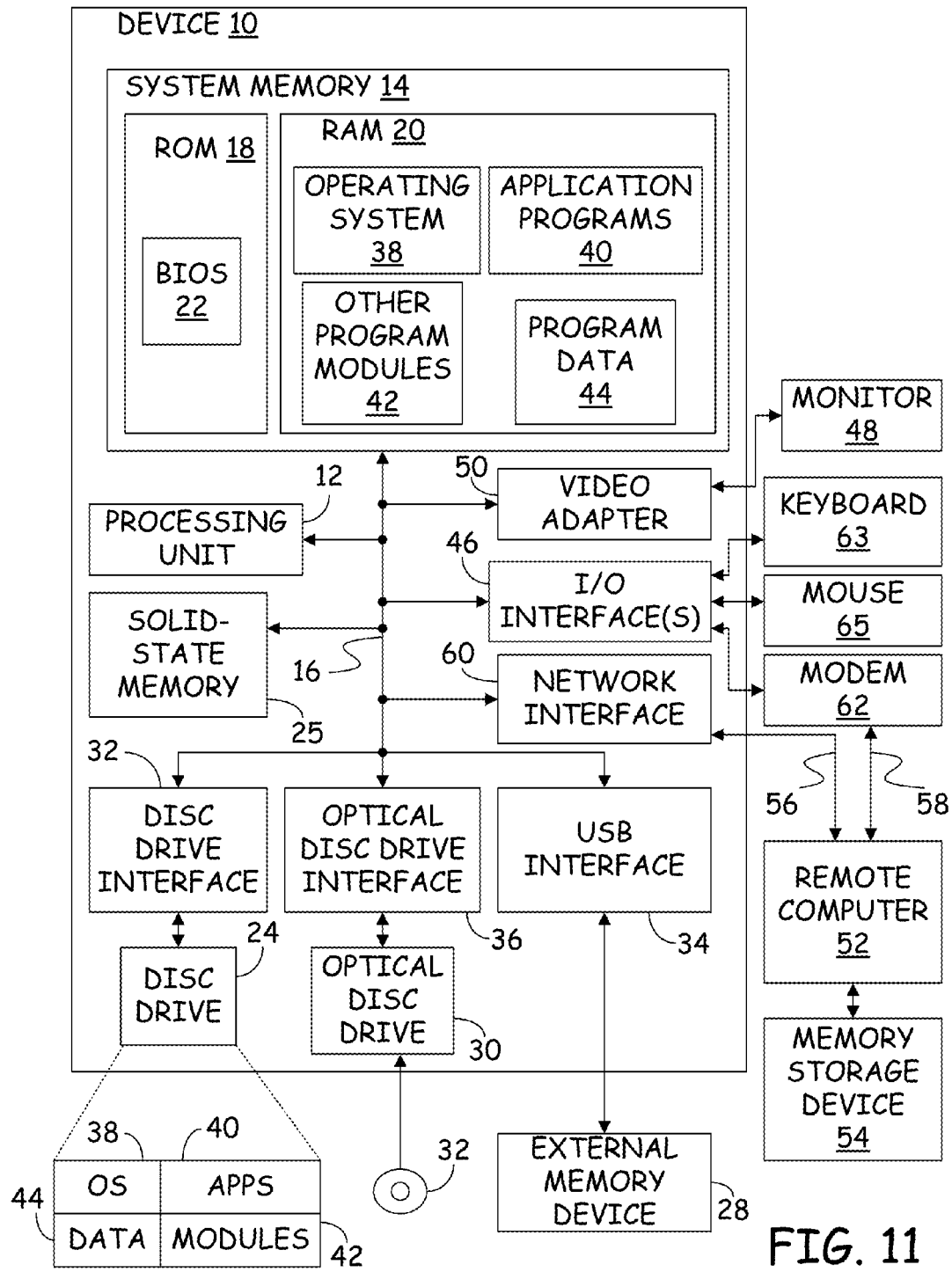
FIG. 11 is a block diagram of a server device used in accordance with some embodiments.

An example of a computing device 10 that can be used as a server and/or client device in the various embodiments is shown in the block diagram of FIG. 11. For example, computing device 10 may be used to perform any of the steps described above. Computing device 10 of FIG. 11 includes a processing unit (processor) 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, a solid state memory 25, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives, solid state memory and external memory devices and their associated computer-readable media provide nonvolatile storage media for computing device 10 on which computer-executable instructions and computer-readable data structures may be stored. Other types of media that are readable by a computer may also be used in the exemplary operation environment.

A number of program modules may be stored in the drives, solid state memory 25 and RAM 20, including an operating system 38, one or more application programs 40, other program modules 42 and program data 44. For example, application programs 40 can include instructions for performing any of the steps described above, which are executed by processor 12. Program data can include any data used in the steps described above.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

Computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 11. The network connections depicted in FIG. 1 include a local area network (LAN) 56 and a wide area network (WAN) 58. Such network environments are commonplace in the art.

Computing device 10 is connected to the LAN 56 through a network interface 60. Computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 11 are exemplary and other means for establishing a communications link between the computers, such as a wireless interface communications link, may be used.

Although the present invention has been described with reference to preferred embodiments, workers skilled in the art will recognize that changes may be made in form and detail without departing from the spirit and scope of the invention.

What is claimed is:

1. A method comprising:
    receiving a plurality of images;
    forming a plurality of composite images from the plurality of images, each composite image formed by mapping pixels from multiple images onto the composite image, wherein forming the plurality of composite images comprises:
        comparing a successive image to a first image of multiple images in a current composite image wherein the first image is the first image added to the current composite image;
        adding the successive image to the current composite image when at least one contour in the successive image matches a contour in the first image; and
        setting the successive image as a new composite image when none of the contours of the successive image matches a contour in the first image;
    counting fruit in each composite image to form a fruit count for each composite image; and
    summing the fruit counts to form a total fruit count.

2. The method of claim 1 wherein comparing the successive image to the first image comprises:
    identifying contours in the first image;
    identifying contours in the successive image;
    selecting a contour in the first image;
    searching for and finding a matching contour in the successive image that matches the selected contour;
    searching for and finding a first image matching contour in the first image that matches the matching contour of the successive image; and
    determining that the first image matching contour is the selected contour.

3. The method of claim 2 wherein identifying contours in the first image and the successive image comprises filtering pixels based on color values for the pixels to locate pixels that are likely to represent fruit and identifying contours within the located pixels.

4. The method of claim 1 wherein counting fruit in a composite image comprises applying a Gaussian mixture model to the composite image.

5. The method of claim 1 wherein forming a composite image comprises determining a separate affine transformation for each of a plurality of contours in one of the plurality of images.

6. A system comprising:
an unmanned aerial vehicle having at least one camera that captures multiple images of an agricultural plot;
a server that receives the captured multiple images and processes the captured multiple images to count fruit in the agricultural plot, wherein the server processes the captured multiple images by:
  forming a plurality of composite images, each composite image formed by mapping a respective plurality of the captured multiple images to a first image of the composite image wherein forming a plurality of composite images comprises comparing a first image of a composite image of a plurality of captured images to a second image and creating a new composite image from the second image when no contour in the second image has a corresponding contour in the first image;
  counting fruit in the composite images to form a separate count for each composite image; and
  summing the separate counts to form a total fruit count.

7. The system of claim 6 wherein determining if a contour in the second image has a corresponding contour in the first image comprises searching for a corresponding contour in the first image and after finding a corresponding contour in the first image, searching the second image for a contour corresponding to the corresponding contour of the first image.

8. The system of claim 6 wherein counting fruit in a composite image comprises applying a Gaussian Mixture Model to the composite image.

9. The system of claim 6 wherein mapping a captured image onto the composite image comprises determining a respective affine transformation for each of a plurality of contours in the composite image, using the affine transformation to identify points of correspondence between the captured image and the composite image and mapping the captured image onto the composite image based on the points of correspondence.

10. The system of claim 9 wherein mapping the captured image onto the composite image comprises setting pixels in the captured image and the composite image to zero if the pixels are unlikely to represent fruit and not mapping pixels in the captured image to the composite image if there is a non-zero pixel in the composite image where the pixel in the captured image would be mapped to.

* * * * *